United States Patent
Zhu et al.

(10) Patent No.: US 6,580,558 B2
(45) Date of Patent: Jun. 17, 2003

(54) OPTICAL ISOLATOR

(75) Inventors: Rong Li Zhu, Oakland, CA (US); Youfu Shao, Milpitas, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/844,547

(22) Filed: Apr. 27, 2001

(65) Prior Publication Data

US 2002/0159149 A1 Oct. 31, 2002

(51) Int. Cl.[7] .......................... G02B 27/28; G02B 6/27; G02B 6/32; G02B 6/36
(52) U.S. Cl. .................... 359/484; 359/494; 359/497; 359/500; 359/501; 359/900; 385/33; 385/39; 385/50; 385/55; 385/73; 385/74; 372/703
(58) Field of Search .................. 372/703; 359/484, 359/494, 495, 496, 497, 500, 900, 501

(56) References Cited

U.S. PATENT DOCUMENTS

| | | | |
|---|---|---|---|
| 4,178,073 A | * 12/1979 | Uchida et al. | 359/484 |
| 4,804,256 A | * 2/1989 | Wilson | 359/281 |
| 5,161,049 A | * 11/1992 | Tanno et al. | 359/281 |
| 5,446,813 A | * 8/1995 | Lee et al. | 385/31 |
| 5,631,771 A | * 5/1997 | Swan | 359/281 |
| 5,642,447 A | * 6/1997 | Pan et al. | 385/31 |
| 5,661,829 A | * 8/1997 | Zheng | 385/33 |
| 5,734,762 A | * 3/1998 | Ho et al. | 385/11 |
| 5,848,203 A | * 12/1998 | Kawakami et al. | 385/11 |
| 5,867,314 A | * 2/1999 | Ota et al. | 335/298 |
| 6,295,393 B1 | * 9/2001 | Naganuma | 385/11 |
| 2002/0012167 A1 | * 1/2002 | Wills et al. | 359/484 |

FOREIGN PATENT DOCUMENTS

| | | | |
|---|---|---|---|
| JP | 57-186732 A | * | 11/1982 |
| JP | 1-244423 A | * | 9/1989 |
| JP | 3-248117 A | * | 11/1991 |
| JP | 4-233510 A | * | 8/1992 |
| JP | 404246615 A | * | 9/1992 |
| JP | 5-157992 A | * | 6/1993 |
| JP | 7-151997 A | * | 6/1995 |
| JP | 10-239636 A | * | 9/1998 |

* cited by examiner

Primary Examiner—John Juba, Jr.
(74) Attorney, Agent, or Firm—Wei Te Chung

(57) ABSTRACT

An optical isolator includes a first pigtail assembly, a first collimating lens aligned with the first pigtail assembly, an optical rotator assembly, an adjustable assembly aligned with the rotator assembly, and a second pigtail assembly having a ferrule and a second optical fiber with an end attached within the ferrule. The rotator assembly includes a first birefringent wedge, an optical rotator and a magnet. The adjustable assembly includes a second birefringent wedge, a second collimating lens, and a holder holding at least a portion of the second birefringent wedge and at least a portion of the second collimating lens therein. The magnet of the rotator assembly encloses the first birefringent wedge and the rotator. The rotator is positioned between the first and second birefringent wedges. The adjustable assembly is adjustable relative to the rotator assembly. This achieves precise positional relationships among the rotator and the first and second birefringent wedges.

20 Claims, 2 Drawing Sheets

OPTICAL ISOLATOR

BACKGROUND OF THE INVENTION

1. Field of the Invention

The present invention relates to an optical isolator, and particularly to an adjustable optical isolator with advantages of high isolation.

2. Description of Related Art

Optical isolators are among the key devices in optical fiber communications which attract attentions as means for materializing a highly information-oriented society in the future. An optical isolator permits the passage of light in one direction through the isolator, but prevents (or at least substantially attenuates) the passage of light in the opposite direction through the isolator.

To achieve such non-reciprocal operation, an optical isolator usually comprises a Faraday rotator which behaves differently, according to the direction in which the light passes through it. A Faraday rotator comprises a material, typically a crystalline material, which is capable of rotating the plane of polarization of light passing through it in response to an external magnetic field. The direction of rotation of the plane of polarization is dependent on both the direction of the light passing through the Faraday rotator and the applied external magnetic field. The Faraday rotator is usually combined with polarizers or birefringent walk off crystals, in order to form an isolator. The rotation of the plane of polarization provided by the Faraday rotator in one direction allows light to pass through both polarizers, whereas in the opposite direction the plane of polarization is rotated so that light is blocked by the polarizer.

U.S. Pat. No. 6,055,102 discloses such an optical isolator. It includes a pair of optical polarizers with their optical axes set at a mutual relative angle of about 45 degrees, and a Faraday rotator having a Faraday rotation angle of about 45 degrees inserted between the optical polarizers. The two polarizers and the sandwiched Faraday rotator are bonded together. The optical isolator functions to allow a forward light from a laser to pass therethrough, and to shut out a backward or return light coming back to the laser. A permanent magnet is provided for applying a static magnetic field to the Faraday rotator, to magnetically saturate or nearly saturate the Faraday rotator. The magnet defines a slot for accommodating the combination of the polarizers and the Faraday rotator therein.

As disclosed in U.S. Pat. Nos. 5,208,876, 5,317,655 and Re. 35,575, one important factor in the performance of optical isolators is the polarizers employed. The two birefringent polarizers of these patents are wedge-shaped, and arranged for optimum optical performance. The first polarizer has a front surface that receives light in the forward direction slanted at an angle Φ varying from 8 degrees to 15 degrees. Similarly, the second polarizer is slanted by the same angle Φ in a complementary fashion to the first polarizer. The slanted surfaces are parallel to each other. The slant of the polarizers reduces the forward reflectivity or return loss, to approximately −60 to 65 dB. This reduction is important for meeting the demands of present-day fiber optic networks.

Another example of a conventional isolator is shown in FIG. 1. An isolator 1' comprises a pair of collimating sub-assemblies 19' and a combination, i.e., the isolator core, sandwiched therebetween. The combination has a magnetic ring 12', a pair of wedge-shaped polarizers 13', 15' and a Faraday rotator 14' disposed between the two polarizers 13', 15'. The polarizers 13', 15', and the rotator 14' are all fixed within the magnetic ring 12'. Each collimating sub-assembly 19' comprises a pigtail element 10' (17') holding one end of an optical fiber therein and a lens 11' (16') which is commonly a GRIN lens.

The polarizers 13', 15' of the isolator are fixed together within the magnetic ring 12'. The optical axes of the polarizers 13', 15' are required to be crossed at a certain angle, preferably 45 degrees. Thus unduly high manufacturing specifications and standards are required for achieving good isolation of the isolator 1'.

Another isolator disclosed in U.S. Pat. No. 5,359,689, is shown in FIG. 2. It comprises an attaching member 5 holding an optical fiber 4 therein, a ferrule 51 positioned in the attaching member 5 and accommodating a bared end 41 of the fiber 4, a holder 52 positioned at one end of the attaching member 5 and receiving a slanted end of the ferrule 51 therein, a magnet 54 attached to the holder 52, and a sleeve 53 enclosing the magnet 54 and fixed to the attaching member 5. An isolating combination includes a pair of birefringent elements 42, 44 and a Faraday rotator 43 sandwiched therebetween. The birefringent element 44 is attached in the holder 52 together with the slanted end of ferrule 41.

This isolator is relatively easy to mass-produce. However, it still suffers from much the same design shortcomings as discussed above regarding the isolator 1'. That is, high manufacturing precision is still required thereby limiting any reductions in costs.

BRIEF SUMMARY OF THE INVENTION

An object of the present invention is to provide an adjustable optical isolator having high isolation.

Another object of the present invention is to provide a low-cost optical isolator.

In accordance with one aspect of the present invention, an optical isolator includes a first pigtail assembly, a first collimating lens aligned with the first pigtail assembly, an optical rotator assembly aligned with the first pigtail assembly and the collimating lens, an adjustable assembly aligned with the rotator assembly, and a second pigtail assembly aligned with the adjustable assembly. The rotator assembly includes a first birefringent wedge, an optical rotator, and a magnet for enclosing the first birefringent wedge and the rotator therein. The adjustable assembly comprises a second birefringent wedge, a second collimating lens, and a holder holding at least a portion of the second birefringent wedge and at least a portion of the second collimating lens therein. The first and second pigtail assemblies each have a ferrule and an optical fiber with an end attached within the ferrule.

The rotator is positioned between the first and second birefringent wedges and the position of the adjustable assembly is adjustable relative to the rotator assembly. This achieves precise positional relationships among the rotator and the first and second birefringent wedges.

The first birefringent wedge has a first slanted surface, and the second birefringent wedge has a second slanted surface parallel to the first slanted surface. The first and second slanted surfaces of the first and second birefringent wedges may both confront the rotator, or both face away from the rotator. Alternatively, the rotator may form a pair of opposite surfaces which are slanted and parallel to the first and second slanted surfaces of the first and second birefringent wedges.

DETAILED DESCRIPTION OF THE INVENTION

Figure 1:
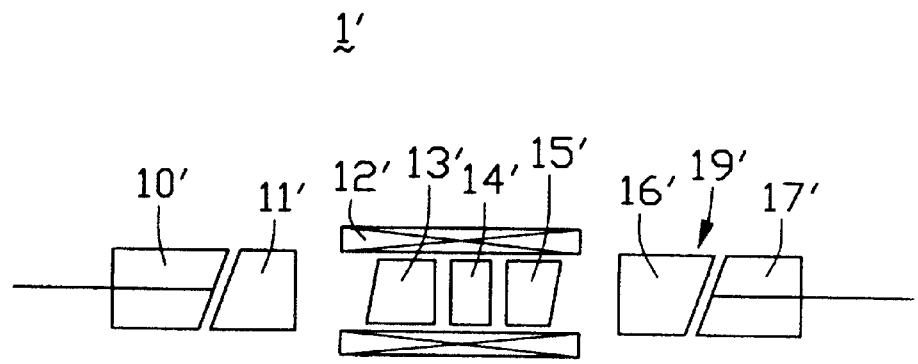
FIG. 1 is a schematic view of a conventional optical isolator.
Figure 2:
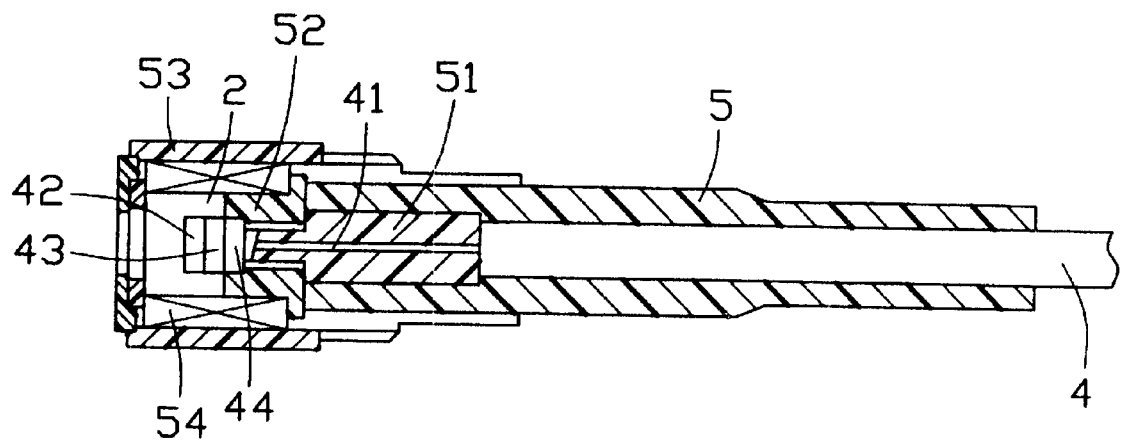
FIG. 2 is a cross-sectional view of another conventional optical isolator.
Figure 3:
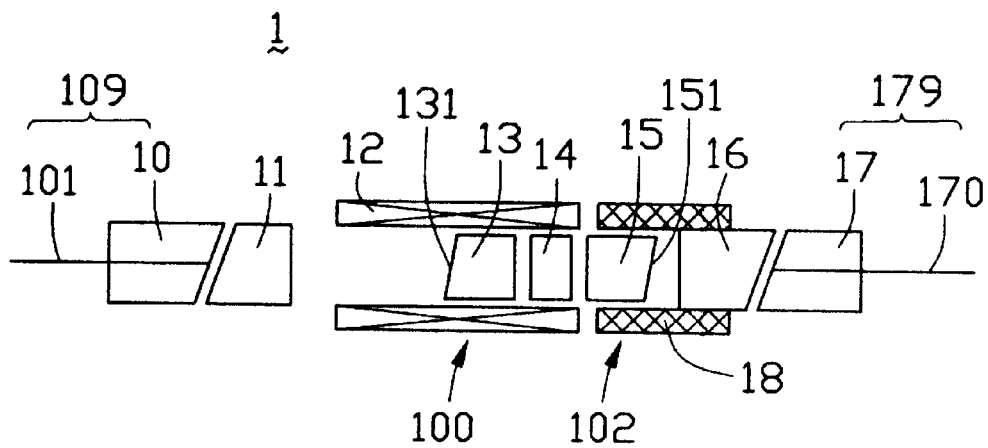
FIG. 3 is a schematic view of an optical isolator in accordance with a first embodiment of the present invention.

Referring to FIG. 3, an optical isolator 1 in accordance with a first embodiment of the present invention includes a first pigtail assembly 109, a first collimating lens 11 aligned with the first pigtail assembly 109, an optical rotator assembly 100, an adjustable assembly 102 aligned with the rotator assembly 100, and a second pigtail assembly 179 aligned with the adjustable assembly 102. The rotator assembly 100 is aligned with the first pigtail assembly 109 and the first collimating lens 11.

The rotator assembly 100 may be a Faraday rotator or similar devices comprising a first birefringent crystal 13, an optical rotator 14 and a permanent magnet 12 enclosing the first birefringent crystal 13 and the rotator 14. The adjustable assembly 102 includes a second birefringent crystal 15, a second collimating lens 16, and a holder 18 retaining at least a portion of the second birefringent crystal 15 and at least a portion of the second collimating lens 16.

The first and second birefringent crystals 13, 15 are formed in a wedge shapes. Accordingly, they are also referred to as birefringent wedges herein. The first birefringent wedge 13 has a first slanted surface 131, and the second birefringent wedge 15 has a second slanted surface 151 parallel to the first slanted surface 131.

The first and second pigtail assemblies 109, 179 each have a ferrule 10, 17 and an optical fiber 101, 170 with an end attached within the ferrule 10, 17. Each ferrule 10, 17 forms an oblique surface. The end of each fiber 101, 170 is flush with the oblique surface of the corresponding ferrule 10, 17. The first and second collimating lenses 11, 16 are preferably GRIN lenses, and each has an inclined surface parallel to the oblique surface of the corresponding ferrule 10, 17.

The rotator 14 is positioned between the first and second birefringent wedges 13, 15. The position of the adjustable assembly 102 is adjustable relative to the rotator assembly 100 for achieving precise positional relationships among the rotator 14 and the first and second birefringent wedges 13, 15. The permanent magnet 12 is preferably a magnetic ring.

In the optical isolator 1 of the first embodiment of the present invention, the first birefringent wedge 13 and the rotator 14 are fixed within the magnetic ring 12. The first collimating lens 11 is attached to the first pigtail assembly, with the inclined surface of the collimating lens 11 opposing and parallel to the oblique surface of the ferrule 10. The oblique surface of the ferrule 17 of the second pigtail assembly 179 is attached to the inclined surface of the second collimating lens 16.

The combination of the first pigtail assembly 109 and the first collimating lens 11 is fixed in alignment with the birefringent wedge 13 and the rotator 14. The positional relationship between the first and second birefringent wedges 13, 15 is adjusted by a fine tuning operation using the adjustable assembly 102. The adjustable assembly 102 is moved and/or rotated relative to the rotator assembly 100 until an optimally high isolation is obtained.

Figure 4:
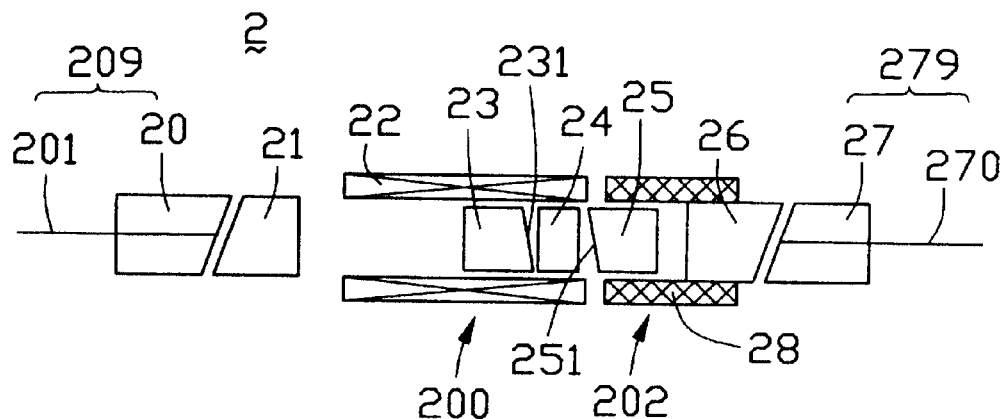
FIG. 4 is a schematic view of an optical isolator in accordance with a second embodiment of the present invention.
Figure 5:
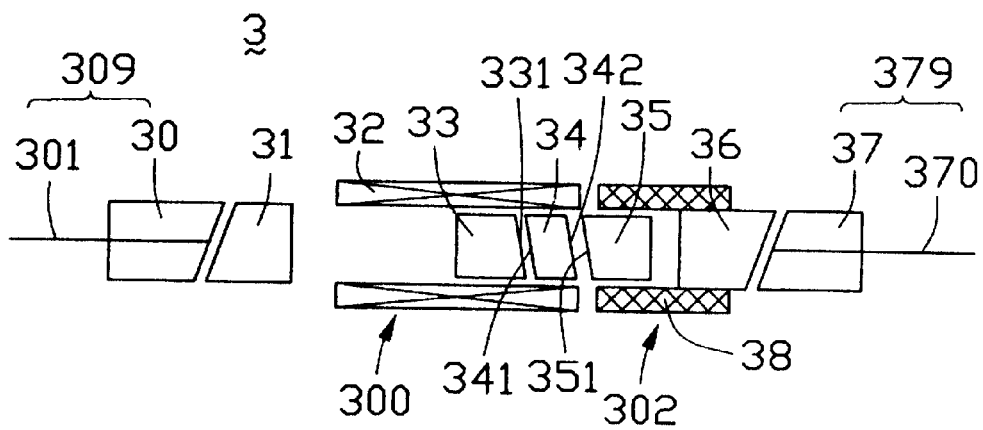
FIG. 5 is a schematic view of an optical isolator in accordance with a third embodiment of the present invention.

FIGS. 4 and 5 respectively show optical isolators 2, 3 in accordance with the second and third embodiments of the present invention. The optical isolators 2, 3 are substantially the same as the optical isolator 1 of the first embodiment. It is noted that similar parts of FIGS. 3, 4 and 5 are designated with the same reference numeral, but with the prefix "1" for the first embodiment replaced by prefixes "2" and "3" for the second and third embodiments respectively. Details of the second and third embodiments that are the same as in the first embodiment are omitted herein for brevity.

The differences between the first, second and third embodiments rely in the relationship between the first and second birefringent wedges 13 (23, 33), 15 (25, 35) and the rotator 14 (24, 34) as described below.

In the first embodiment, the first and second slanted surfaces 131, 151 of the first and second birefringent wedges 13, 15 both face away from the rotator 14 while remaining parallel to each other. However, in the second embodiment, the first and second slanted surfaces 231, 251 of the first and second birefringent wedges 23, 25 both face toward the rotator 24.

However, the rotator 34, in the third embodiment, forms a pair of opposite surfaces 341, 342 which are slanted and parallel to the first and second slanted surfaces 331, 351 of the first and second birefringent wedges 33, 35. The first and second slanted surfaces 331, 351 of the first and second birefringent wedges 33, 35 both confront with the rotator 34 while remaining parallel to each other.

It can be seen that the conventional isolator uses an isolator core, i.e., a combination of the magnetic ring enclosing a pair of wedge-shaped birefringent crystals sandwiching a Faraday rotator therebetween, and later cooperates with a pair of collimating sub-assemblies to determine the whole isolator axial position/dimension thereof wherein the relative positions between the two birefringent crystals are generally fixed by the isolator core provider/vender, and thus the isolator manufacturer, who buys the standard isolator core and adjusts the relative positions of the two collimating sub-assemblies to the isolator core to finalize the whole isolator package, may not efficiently finely tune isolation thereof due to the fixed/unchangeable space between the pair of birefringent crystals incapable of complying with the characters of the collimating sub-assemblies and the specific wavelength of the transmitting light. In opposite, in the instant invention, because the space between the birefringent crystals is adjustable to comply with the corresponding collimating sub-assemblies and the application wavelength, the isolation can be finely tuned to an extent much better than what the traditional isolator performs.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical isolator comprising:
   a first pigtail assembly comprising a first ferrule and a first optical fiber, one end of the first optical fiber arranged within the first ferrule;
   a first collimating lens aligned with the first pigtail assembly;
   an optical rotator assembly aligned with the first collimating lens, and comprising a first birefringent wedge and an optical rotator enclosed in a magnet;
   an adjustable assembly aligned with the rotator assembly, the adjustable assembly comprising a holder, a second birefringent wedge substantially retained in the holder, and a second collimating lens partially retained in the holder, thereby providing an access thereto; and
   a second assembly comprising a second ferrule, and a second optical fiber, one end of the second optical fiber arranged within the second ferrule; wherein
      the rotator is positioned between the first and second birefringent wedges and the position of the adjustable assembly is adjustable relative to the rotator assembly for achieving precise positional relationship among the rotator and the first and second birefringent wedges.

2. The optical isolator as claimed in claim 1, wherein the rotator is a Faraday rotator.

3. The optical isolator as claimed in claim 1, wherein the magnet is a permanent magnetic ring.

4. The optical isolator as claimed in claim 1, wherein the first birefringent wedge has a first slanted surface and the second birefringent wedge has a second slanted surface.

5. The optical isolator as claimed in claim 4, wherein the first slanted surface of the first birefringent wedge is parallel to the second slanted surface of the second birefringent wedge.

6. The optical isolator as claimed in claim 4, wherein the first and second slanted surfaces of the first and second birefringent wedges both confront the rotator.

7. The optical isolator as claimed in claim 4, wherein the first and second slanted surfaces of the first and second birefringent wedges face away from the rotator.

8. The optical isolator as claimed in claim 4, wherein the rotator forms a pair of opposite surfaces which are slanted and both parallel to the first and second slanted surfaces of the first and second birefringent wedges.

9. An optical isolator comprising:
   a first pigtail assembly comprising a first optical fiber
   a first lens aligned with the first pigtail assembly;
   an optical rotator assembly comprising an optical rotator and a first birefringent wedge arranged within a permanent magnet;
   an adjustable assembly comprising a holder, a second birefringent wedge partially retained in the holder, a second lens retained in the holder, the lens aligned with the second birefringent wedge and the first pigtail assembly respectively; and
   a second pigtail assembly comprising a second optical fiber; wherein
      the adjustable assembly can be adjusted relative to the rotator assembly for precisely adjusting the positional relationships among the rotator and the first and second birefringent wedges, thereby achieving optimum isolation.

10. The optical isolator as claimed in claim 9, wherein the first pigtail assembly comprises a first ferrule retaining one end of the first optical fiber therein.

11. The optical isolator as claimed in claim 9, wherein the second pigtail assembly comprises a second ferrule retaining one end of the second optical fiber therein.

12. The optical isolator as claimed in claim 9, wherein the rotator is a Faraday rotator.

13. The optical isolator as claimed in claim 9, wherein the magnet is a permanent magnetic ring.

14. The optical isolator as claimed in claim 9, wherein the first birefringent wedge has a first slanted surface and the second birefringent wedge has a second slanted surface.

15. The optical isolator as claimed in claimed in claim 14, wherein the first slanted surface of the first birefringent wedge is parallel to the second slanted surface of the second birefringent wedge.

16. The optical isolator as claimed in claim 14, wherein the first and the second slanted surfaces of the first and second birefringent wedges both confront the rotator.

17. The optical isolator as claimed in claim 14, wherein the first and second slanted surfaces of the first and second birefringent wedges face away from the rotator.

18. The optical isolator as claimed in claim 14, wherein the rotator has a pair of opposite surfaces which are slanted and both parallel to the first and second slanted surfaces of the first and second birefringent wedges.

19. A sub-assembly of an isolator, comprising:
   a rotator assembly and an adjustable assembly,
   said rotator assembly including:
      a magnetic ring enclosing therein both a first birefringent wedge and an optical rotator with an unchangeable distance therebetween; and
   said adjustable assembly including:
      a holder enclosing a second birefringent wedge and a lens with an unchangeable distance therebetween, at least one of the second birefringent wedge and the lens being partially retained within the holder; wherein
      the rotator assembly and the adjustable assembly are aligned with and assembled to each other under a condition that the second birefringent wedge confronts the rotator, and the adjustable assembly is axially moved relative to the rotator assembly to finely tune isolation thereof before the rotator assembly and the adjustable assembly are finally secured relative to each other.

20. A method of assembling an isolator, comprising the steps of:
   providing a rotator assembly with a magnetic ring retainably enclosing therein both a first birefringent wedge and an optical rotator with a fixed distance therebetween;
   providing an adjustable assembly with a tubular holder retainably enclosing a second birefringent wedge and a lens with a fixed distance therebetween wherein at least one of the second birefringent wedge and the lens are partially retained within the tubular holder, and the rotator assembly and the adjustable assembly generally are axially aligned with each other with the rotator of the rotator assembly confronting the second birefringent wedge of the adjustable assembly in a changeable distance;
   adjusting the distance between the rotator and the second birefringent wedge to finely tune isolation thereof; and
   fixing relative positions between the rotator assembly and the adjustable assembly.

* * * * *